United States Patent
El Harrak et al.

(10) Patent No.: US 12,446,599 B2
(45) Date of Patent: Oct. 21, 2025

(54) MULTILAYER CONTROLLED RELEASE FEED OR FEED SUPPLEMENT FOR LIVESTOCK ANIMALS

(71) Applicant: HUDDLE CORP, Nantes (FR)

(72) Inventors: Abdeslam El Harrak, Faulquemont (FR); César Adrien Claude René Cretel, Asnieres (FR)

(73) Assignee: HUDDLE CORP, Nantes (FR)

( * ) Notice: Subject to any disclaimer, the term of this patent is extended or adjusted under 35 U.S.C. 154(b) by 719 days.

(21) Appl. No.: 17/770,149

(22) PCT Filed: Nov. 9, 2020

(86) PCT No.: PCT/FR2020/052042
§ 371 (c)(1),
(2) Date: May 9, 2022

(87) PCT Pub. No.: WO2021/089971
PCT Pub. Date: May 14, 2021

(65) Prior Publication Data
US 2022/0386651 A1    Dec. 8, 2022

(30) Foreign Application Priority Data
Nov. 7, 2019    (FR) ...................................... 1912521

(51) Int. Cl.
| | |
|---|---|
| A23K 40/30 | (2016.01) |
| A23K 20/147 | (2016.01) |
| A23K 20/158 | (2016.01) |
| A23K 20/28 | (2016.01) |

(52) U.S. Cl.
CPC ............ *A23K 40/30* (2016.05); *A23K 20/147* (2016.05); *A23K 20/158* (2016.05); *A23K 20/28* (2016.05)

(58) Field of Classification Search
CPC ................................ A23P 10/30; A23K 20/28
See application file for complete search history.

(56) References Cited

U.S. PATENT DOCUMENTS

| | | |
|---|---|---|
| 2003/0064133 A1 | 4/2003 | Blatt et al. |
| 2006/0068019 A1 | 3/2006 | Dalziel et al. |
| 2017/0258725 A1 | 9/2017 | Vetter |

FOREIGN PATENT DOCUMENTS

| | | |
|---|---|---|
| JP | H10327770 A | 12/1998 |
| WO | 2009089115 A1 | 7/2009 |
| WO | 2013119384 A1 | 8/2013 |
| WO | 2016193373 A1 | 12/2016 |

OTHER PUBLICATIONS

International Search Report in related PCT Application No. PCT/FR2020/052042, mailed May 10, 2022.

*Primary Examiner* — Michele L Jacobson
(74) *Attorney, Agent, or Firm* — Thomas | Horstemeyer, LLP

(57) ABSTRACT

The invention relates to a feed or a feed supplement in the form of modularly stacked objects for the controlled release of nutrients and/or physiologically active substances for monogastric animals, comprising a core and a coating of the core, wherein the core has an aqueous phase with water-soluble active substances and a lipid phase with fat-soluble active components, in which the lipid phase comprises a mineral filler, and the coating layers and the aqueous phases advantageously have a dispersed exfoliated mineral filler.

19 Claims, 11 Drawing Sheets

MULTILAYER CONTROLLED RELEASE FEED OR FEED SUPPLEMENT FOR LIVESTOCK ANIMALS

CROSS REFERENCE TO RELATED APPLICATIONS

This application is the 35 U.S.C. § 371 national stage application of PCT Application No. PCT/FR2020/052042, filed Nov. 9, 2020, which application claims the benefit of French Application No. FR 1912521 filed Nov. 7, 2019, both of which are hereby incorporated by reference herein in their entireties.

FIELD OF THE INVENTION

The invention relates to a feed or feed supplement for monogastric farmed animals, in particular fish. In particular, the invention relates to feeds or feed supplements allowing a controlled release of active substances that they contain.

PRIOR ART

It is well known to use physiologically active substances for supplementing the livestock food in order to improve their sanitary conditions and accelerate their growth.

Such physiologically active substances can be proteins, lipids or carbohydrates, but also vitamins and any form of feed supplement targeting prebiotics, probiotics, amino acids, antioxidants, or other molecules (i.e. essential oils) for direct or indirect nutraceutical or therapeutic purposes.

The diversity of conditions under which the feeds are ingested and digested requires a response adapted to each species and to each stage of maturity of the animals.

For example, document JPH10327770 describes microcapsules containing an aqueous phase with water-soluble active substances dispersed in a lipid phase with liposoluble active substances, the whole being coated with a biodegradable polymer dispersed during preparation in an oil and organic solvent mixture. The microcapsules have a size of 5 to 20 µm and are suitable for feeding rotifers, which are themselves prey for farmed alevin. Examples of biodegradable coating polymers include polysaccharides, polypeptides, aliphatic polyesters and gelatin. Polysaccharides are preferred. The method for preparing the coating system described in that document requires dissolving the coating biopolymer in an organic solvent, which is not recommended for a product intended to enter the food chain. Moreover, the coating system can only be dissolved in the digestive system of the animal by chain scission. This requires appropriate kinetics and enzymes often obtained by the action of the microbiota at the end of the digestive tract. For example, cellulose cannot be digested by fish because they cannot perform these chain scissions. Consequently, the digestion may be slowed and delayed by the low digestibility of the fibres used.

Interest remains for feeds or feed supplements, the structures and manufacturing methods of which enable a response to be proposed which is adapted to each species and to each stage of maturity of the animals.

Moreover, in particular, there is a need for feeds and feed supplements which allow a rapid but sequenced release of active substances or nutrients, that is in precise and identified zones of the digestive system of the target animal for a better metabolism of these nutrients.

BRIEF DESCRIPTION OF THE INVENTION

The object of the invention is the following products:

Feed or feed supplement, in the form of modularly stacked objects O, enabling a controlled release of nutritive and/or physiologically active substances for monogastric animals, comprising a core 12 and a coating 14 of the core 12, said core 12 comprising an aqueous phase A with water-soluble active substances and a lipid phase 18 with liposoluble active components, characterised in that said lipid phase 18 contains a mineral filler.

1. Feed or feed supplement enabling a controlled release of nutritive and/or physiologically active substances for monogastric animals, comprising a core 12 and a coating 14 of the core 12, said core 12 comprising an aqueous phase A with water-soluble active substances and a lipid phase 18 with liposoluble active components, such that the aqueous phase A consists of gel particles 16, the particles 16 are dispersed in the lipid phase 18, and such that the lipid phase 18 includes an exfoliated mineral filler chosen in the group of phyllosilicates. The feed or feed supplement is thus in the form of modularly stacked objects O.
2. Feed or feed supplement according to product 1, wherein the phyllosilicate is a smectite.
3. Feed or feed supplement according to any one of the preceding products, wherein the dispersion of the mineral filler in the lipid phase 18 is carried out in the presence of a surfactant.
4. Feed or feed supplement according to product 3, wherein the surfactant has a cationic or zwitterionic polar head.
5. Feed or feed supplement according to product 3 or 4, wherein the surfactant is lecithin.
6. Feed or feed supplement according to any one of the preceding products, wherein said mineral filler has a content in said lipid phase 18 of between 0.5 and 35 wt % with respect to the weight of said lipid phase 18 and preferably less than 15%.
7. Feed or feed supplement according to any one of the preceding products, comprising a gelled protein phase 11 arranged between the core 12 and the coating 14.
8. Feed or feed supplement according to claim 7, wherein the gelled protein phase includes a mineral filler.
   Feed or feed supplement according to any one of the preceding products, wherein the core 12 and optionally the protein phase 11 is coated in an alternance of polymers of opposing charges, forming a coacervate.
9. Feed or feed supplement according to any one of the preceding products, wherein the coating 14 of the core 12 includes n layers C of biocompatible materials with an alternating stacking of positive and negative electrostatic charges which form cross-linked and structured coacervates in a stack of layers, n being at least equal to 2 and the n layers C comprising at least one layer C+ comprising a biocompatible material M+ with positive electrostatic charges and a cross-linking agent R− chosen among the multiply charged anions, and at least one layer C− comprising a biocompatible material M− with negative electrostatic charges and a cross-linking agent R+ chosen among the multivalent cations.
10. Feed or feed supplement according to product 9, wherein the coating layers 14 advantageously include a layer of reinforcement material MR.
11. Feed or feed supplement according to one of products 9 to 10, wherein the mineral filler or the reinforcement material is chosen from the group consisting of clays, silicas and charged fibres, advantageously from the group of phyllosilicates.

12. Feed or feed supplement according to product 11, wherein the phyllosilicate is a smectite.

13. Feed or feed supplement according to any one of the preceding products, wherein the aqueous phase A includes a negatively-charged carboxylic functionalised polysaccharide, such as an alginate with a content of between 1 and 8 wt % relative to the weight of a dry extract of said aqueous phase, preferably less than 5.5%, advantageously of between 1 and 4%.

14. Feed or feed supplement according to product 13, wherein the aqueous phase A is gelled by reaction of said charged polysaccharide with reactants such as a calcium salt in the presence of pyrophosphate or glucono-delta-lactone.

The presence of an exfoliated phyllosilicate-type mineral filler, for example exfoliated smectite, in the lipid matrix 18 of the core has the advantage of making it possible to modulate the density of the products and thus their ability to float. This exfoliated mineral filler is in the form of separate sheets which gives to it a very high specific surface area of between 100 $m^2/g$ and 800 $m^2/g$, advantageously of between 200 $m^2/g$ and 500 $m^2/g$ according to the quality of the exfoliation. Small molecules such as oxygen can be adsorbed on these sheets. This exfoliated mineral filler thus forms a barrier which opposes the penetration and diffusion of aggressive molecules from the outside towards the nutrients contained in the products, in particular oxygen. It also enables the lipid phase 18 to be microstructured due to a fractal organisation of the mineral filler, percolating in the three directions until covering all of the lipid phase, thus contributing to the containment of the nutrients and other molecules of interest. The presence of phyllosilicate sheets also enables for adsorbing molecules of interest that bring additional properties to the lipid phase 18. For example, the phyllosilicate sheets with high specific surface area can be the support for dispersing protective molecules such as polar antioxidants, even though they are insoluble or poorly soluble in a lipid phase. This is the case, for example, for vitamin C, certain water-soluble polyphenols, flavonoids, etc.

In addition, the gelling of the aqueous phase A dispersed in the lipid matrix 18 has the advantage of limiting leakage of nutrients outwards. It also allows the size of the particles to be stabilised by avoiding their coalescence, and thus increasing the interface area of the aqueous phase A with the digestive agents and thus accelerating the release rate in the digestion phase.

DESCRIPTION OF THE FIGURES

The invention is further described in FIGS. 1 to 14, given by way of illustration only.

DETAILED DESCRIPTION OF THE INVENTION

The term "object" or "feature" shall refer to the various constituent parts of feeds or feed supplements according to the invention.

The term "product" shall refer to the feeds and feed supplements according to the invention, obtained by stacking various objects.

The term "gel" shall mean a material mainly consisting of liquid, but which has a behaviour close to that of a solid due to a three-dimensional network tangled within the liquid. It is these entanglements which give the gels their structure and their properties. The three-dimensional network of solids diluted in the liquid can be the result of chemical or physical bonds, or of small crystals or other bonds which remain intact in the dispersion liquid.

In the context of the present invention, the term "exfoliated mineral filler" shall mean a mineral filler having undergone an exfoliation, in other words a more or less complete separation of its individual sheets. The exfoliation process usually comprises three phases:

(1) Pre-swelling of the phyllosilicate sheets by swelling in water,
(2) Adsorption of a hydrophobic molecule at the surface of the phyllosilicate particles, in order to make it compatible with the dispersion lipid phase, for example lecithin, and
(3) The application of shear energy in order to separate the phyllosilicate particles in solution.

In the context of the invention, the specific surface area (Ss) also called "area per unit of mass" represents the surface area of the object (As) per unit of mass (M) and is generally expressed in $m^2/g$. The specific surface area designates the actual area of the objects accessible surface as opposed to its apparent surface.

Figure 1:
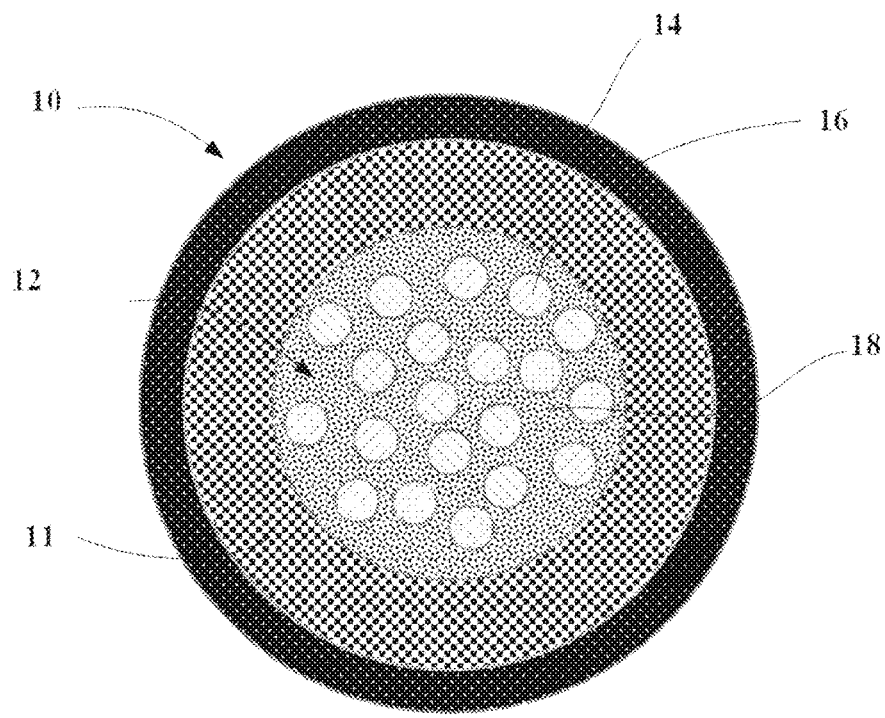
FIG. 1 schematically shows, in cross-section and without respecting the respective dimensions, a first object product of the invention.

FIG. 1 shows, schematically and in cross-section, without respecting the respective dimensions of each phase, a first product 10 containing a lipid phase 18 including a mineral filler according to one of the objects of the invention.

This first product 10 comprises a core 12, a protein phase 11 and a coating 14 of the assembly of the core 12 and the protein phase 11. The core 12 comprises an aqueous phase A in the form of spherical (or irregular) gel particles 16, the particles 16 are dispersed in a lipid matrix 18. The protein phase 11 surrounds the core 12 and is surrounded by the coating 14.

A first feature or object of this first product 10 is that it contains a gelled aqueous phase A containing water-soluble active substances, including in particular nutrients. Hence the gel particles 16 contain water-soluble active substances, including in particular nutrients.

Advantageously, the size of the gel particles 16 is between 1 and 200 μm and preferably between 20 and 100 μm.

The gelling of the aqueous phase A makes it possible to limit the leakage of nutrients and active substances out of the particles 16. It also enables a stabilisation of the particle sizes 16 by limiting the coalescence and thus increasing the specific surface area to of the aqueous phase A, namely the sum of the specific surface areas of each gelled particle 16, and therefore accelerating the rate of release of active substances that it contains in the digestion phase.

According to a preferred embodiment, the aqueous phase A includes an anionic polysaccharide such as an alginate with a content between 1 and 4 wt % relative to the weight of the aqueous phase.

According to a preferred embodiment, the aqueous phase A includes a carboxylic functionalised polysaccharide, and is thus negatively charged under the appropriate conditions of pH, such as an alginate with a content between 1 and 8 wt % of carboxylic functionalised polysaccharide relative to the weight of a dry extract of the aqueous phase A, in other words relative to the weight of a dry extract of the assembly of gel particles 16, and advantageously between 1 and 5.5 wt %, more advantageously between 1 and 4 wt %.

The aqueous phase A can advantageously be a gel formed by reaction of the advantageously carboxylic functionalised, anionic polysaccharide, with reagents such as a calcium salt as well as pyrophosphate or glucono-delta-lactone.

The calcium salt can be chosen from the group consisting of calcium sulfate, carbonate, lactate, citrate, tartrate, caseinate and stearate, and the mixtures thereof, in particular in the group consisting of calcium sulfate, carbonate and stearate, and the mixtures thereof.

The solubility of the calcium salt is obtained by reaction with protons (acids) released in situ. It can be generated by pyrophosphate or glucono-delta-lactone reagents, in contact with water.

Advantageously, the aqueous phase A also includes an osmotic agent.

This osmotic agent can be chosen from the group consisting of sugars, salts, water-soluble polymers preferably of molecular weight less than 150 kg/mol and the combinations thereof.

A preferred choice of osmotic agent can be sorbitol with a content less than 5 wt % relative to the weight of the aqueous solution, i.e. of the aqueous phase A (in its to complete formulation) in order not to make the final product indigestible. A content between 0.8 wt % and 1.5 wt % of sorbitol is optimum. Advantageous use of Guérande salt is also possible, which also brings useful mineral salts.

Preferably, the content of the aqueous phase A dispersed in the lipid matrix 18, and hence the content of gel particles 16, is comprised between 10 and 50 vol %, and preferably between 15 and 30 vol % relative to the total volume of the aqueous phase A and of the lipid matrix 18, in other words relative to the total volume of the core 12.

Below 10 vol %, the volume of the aqueous phase A is no longer sufficient to easily introduce the water-soluble active substances and to have a good homogeneity of composition of the cores 12 of the products.

Above 50 vol %, it becomes much more difficult to maintain a dispersed water emulsion, in other words the gel particles 16, in the lipid phase 18.

The aqueous phase A gel can contain a hydrophilic active substances such as amino acids, vitamins, prebiotics, probiotics, antioxidants and the combinations thereof.

A second feature or object of this first product 10 is that the aqueous phase 16, in other words the gel particles 16, is dispersed in a lipid matrix or phase 18.

Advantageously, the second object or feature of the product 10, the lipid matrix 18, comprises at least one vegetable or animal oil, in particular fish oil, and at least one crystallisable wax. The waxes can be of animal (beeswax) or vegetable origin.

Preferably, the waxes used are crystallisable waxes with a melting temperature below 90 degrees Celsius and very preferably below 65 degrees Celsius.

The wax content is advantageously between 5 and 25 wt % relative to the weight of the whole lipid matrix 18, and very advantageously between 10 and 20%.

According to preferred embodiments, the lipid matrix 18 is substantially spherical and thus the core 12 is substantially spherical and of diameter between 10 and 1000 μm and preferably between 200 and 400 μm.

The lipid matrix 18 can advantageously contain vitamins.

Preferably, this lipid matrix 18 has a high content of omega 6 and omega 3, in particular of DHA and EPA types.

The lipid matrix 18 advantageously includes at least 1 wt % omega 3 of DHA and EPA types, relative to the weight of the lipid matrix 18. It also preferably comprises less than 30 wt % omega 3 of DHA and EPA types and very preferably less than 10 wt % relative to the weight of the lipid matrix 18.

According to an essential feature, the lipid phase 18 includes an exfoliated mineral filler chosen from the group consisting of phyllosilicates, such as clays, talcs and micas. The exfoliated mineral filler advantageously has a specific surface area greater than 100 m$^2$/g, advantageously between 100 m$^2$/g and 800 m$^2$/g, more advantageously between 200 and 500 m$^2$/g.

The phyllosilicate is preferably a smectite. Smectites have the advantage, through their laminar structure with a larger gap between the lamellae than other phyllosilicates, of being able to be swollen by small molecules with hydrophobic properties, which will improve the exfoliation of the clay platelets and thus facilitate their dispersion in the lipid matrix 18. Micas and talcs can also be exfoliated in this way, but the energy which would be necessary to disperse the lamella sheets in the lipid matrix would be much higher.

According to an advantageous embodiment, the content of the mineral filler in the lipid matrix 18 is comprised between 0.5 wt % and 35 wt % and preferably less than 15 wt %, in other words between 0.5 wt % and 15 wt %, relative to the weight of the lipid matrix 18.

The presence of this mineral filler in the lipid matrix 18 has several important advantages. Firstly, the filler enables the density to be controlled and, consequently, the ability of the products to float when they are used in aquaculture. It also reinforces the resistance of the products to the action of oxygen by strongly reducing its diffusion kinetics in the core 12 of the products and acts as a barrier to limit the leakage of small molecules of nutrients and active substances. Finally, the very large surface area developed by the smectite sheets enables microstructuring of the lipid matrix 18 on the nanometre scale, which makes it possible to compartmentalise and act on the kinetics of digestibility of the lipid matrix 18.

The third feature of this first product 10 is a gelled protein phase 11 surrounding the lipid matrix 18, and thus surrounding the core 12. This protein phase 11 contains proteins. This protein phase 11 is advantageously prepared from proteins dissolved in a aqueous phase A2 gel.

The term "protein" shall mean the amino acids and all their oligomers and polymers, in particular oligopeptides, polypeptides and proteins.

The presence of this protein phase 11 has the advantage of providing to the target animal in addition to the active substances, the amino acids necessary for its growth, and to promote the attractive nature of the feed 10.

Advantageously, the protein content of this protein phase 11 is between 6 and 95 wt % relative to the weight of a dry extract of the protein phase 11. This content is preferably between 45 and 80 wt % relative to the weight of a dry extract of the protein phase 11.

Above 95% of protein content, gelling of the protein phase 11 becomes difficult, because the proteins block the reactive sites of the polysaccharides. Below 6%, the nutritional contribution becomes insufficient for feed supplements.

The protein phase 11, as illustrated in FIG. 1, surrounds a single core 12 with a substantially spherical geometry. However, depending on the process used for dispersing the cores 12 in the protein phase 11, a given product 10 may contain a plurality of cores 12 dispersed in the protein phase 11. Consequently, the external geometry of the products 10 and of this protein phase 11 is highly variable (see FIG. 12).

The protein phase 11 preferably comprises negatively charged and gellable polysaccharides, such as alginates, pectin, xanthan, gellan gum, etc. These polysaccharides are advantageously present in the aqueous phase A2 and will enable its gelling by reaction in particular of the polysaccharide and the gelling agent. The gelling agent also advantageously enables a cross-linking of the polysaccharides with one another.

The negatively charged polysaccharides can be functionalised with a carboxylic, sulfonate, alcoholate or phosphate function, alone or combined with positive charges (such as hyaluronic acid). The carboxylic function is preferred. The physicochemical conditions are adjusted in order to have an excess of negative charges, promoting gelling conditions.

Advantageously, the gelled protein phase 11 is cross-linked by the action of a gelling agent released with a delay time, which may be a metal that is able to complex with the carboxylic functions, for example, of polysaccharides or a mineral or organic oligomer of opposite charge to the charge of the target polysaccharide, in other words the polysaccharide present in the protein phase 11.

The modulation of the cross-linking delay time between 15 minutes and several hours makes it possible to promote mass mixing of ingredients without mass increase of the gel, and thus to shape the feed or feed supplement 10.

The gelling agent can include cations of calcium, zinc, magnesium or transition metals, and a source of acid protons (such as pyrophosphate or glucono-delta-lactone) that can be hydrolysed in water, enabling the release of the ionic form.

The gelled protein phase 11 can include a content of gelled polysaccharides of between 0.5 and 4.5 wt % and preferably less than 2 wt % relative to the weight of the gelled protein phase 11 during the preparation of this protein phase 11, in other words before the final drying phase of the product 10.

The gelled protein phase 11 preferably comprises a content of gellable polysaccharides of between 2 and 20 wt % and preferably between 2 and 10 wt % relative to the weight of a dry extract of the gelled protein phase 11.

At less than 2 wt % alginate in the protein phase 11, it is observed that the gelling is insufficient for the stability of the product 10. Above 25 wt %, relative to the weight of a dry extract of the protein phase 11, the polysaccharides such as alginate act as a laxative by trapping more water and the associated nutrients.

Advantageously, the proteins of the protein phase 11 include proteins of size less than 30 kDa. The digestion of these proteins can thus take place more rapidly because there are less bonds to cut in order for the fragments of peptides to be at a size that can be assimilated by the digestive tract.

According to an advantageous embodiment, the protein phase 11 also contains a dispersed mineral filler of the silica, phyllosilicate, metal oxide type, etc. The mineral filler is advantageously dispersed in the aqueous phase A2 gel.

This mineral filler, for example clay, has the advantage of being able to modulate the capacity of the products 10 to float. It also forms a barrier which opposes the diffusion of oxygen into the products 10. Indeed, the very large surface area developed by the smectite sheets enables microstructuring of the protein matrix 11 on the nanometre scale, which makes it possible to compartmentalise and play with the kinetics of digestibility of the protein matrix 11. The microstructure is obtained by the interactions between the positively charged sheets on the sides of the sheet and negatively charged on the largest surface of the sheet with the polysaccharide, such as alginate, or the proteins of the protein phase 11.

The mineral filler is advantageously a phyllosilicate and very advantageously a smectite.

The protein phase 11 advantageously contains an osmotic agent.

This osmotic agent can be chosen from the group consisting of sugars, salts, water-soluble polymers preferably of molecular weight of less than 150 kg/mol and the combinations thereof.

A preferred choice can be sorbitol with a content of less than 5 wt % relative to the weight of the aqueous solution, i.e. of the aqueous phase A2 gel (in its complete formulation) in order not to make the final product 10 indigestible. A content between 0.8 wt % and 1.5 wt % is optimum. Advantageous use of Guérande salt is also possible, which can brings useful mineral salts.

According to another advantageous feature, the whole protein phase 11 and core 12 is of any shape with a highest dimension between 500 µm and 5 mm.

The size of the products 10 according to the invention can easily be adapted to the intended target, in order to be compatible with the feed capacities of the latter.

Another object of the invention is a feed with a total protein content which can be between 20 and 70 wt % relative to the weight of the whole finished product 10. This content is obtained after the optional drying last step of the product 10. The proteins are substantially provided by the protein phase 11. In particular, 80% to 100 wt %, advantageously 90% to 100 wt %, of the proteins of the feed are provided by the protein phase 11.

Another object of the invention is a feed with a total protein content which can advantageously be between 40 and 80 wt % relative to the weight of a dry extract of the whole the finished product 10. The proteins are substantially provided by the protein phase 11. In particular, 80% to 100 wt %, advantageously 90% to 100 wt %, of the proteins of the feed are provided by the protein phase.

Another object of the invention is a feed supplement with a total protein content which can be between 10 and 20 wt % relative to the weight of the whole finished product 10. This content is obtained after the optional drying last step of the product 10. The proteins are substantially provided by the protein phase 11. In particular, 80% to 100 wt %, advantageously 90% to 100 wt %, of the proteins of the feed supplement are provided by the protein phase 11.

Another object of the invention is a feed supplement with a total protein content which can advantageously be between 3 and 40 wt % relative to the weight of a dry extract of the whole finished product 10. The proteins are substantially provided by the protein phase 11. In particular, 80% to 100 wt %, advantageously 90% to 100 wt %, of the proteins of the feed supplement are provided by the protein phase 11.

The proteins of the protein phase 11 are at least partially predigested in the stomach of the animal, but the gelling of this protein phase 11 coupled with the coating 14 constitute a physical barrier to the release of these predigested proteins into the stomach. It is useful to limit such a release of predigested proteins into the stomach because, in fish, their metabolising in the stomach would serve to create digestion and motor energy causing ammonia-type rejections coming from this catabolism, instead of being metabolised in the intestines of the animal where their absorption is most efficient for the growth of these animals.

The fourth feature of this first product 10 is to include a coating 14 around the core 12 and the protein phase 11.

This coating 14 can include n layers C of biocompatible materials M+ and M−, in particular biopolymers, with an alternating stacking of positive and negative electrostatic charges which form structured coacervates by stacking of layers, and n is equal to at least 1.

This coating 14 can include n layers C of biocompatible materials M+ and M−, in particular biopolymers, with an alternating stacking of positive and negative electrostatic charges which form cross-linked and structured coacervates by stacking of layers, and n being equal to at least 2.

The one or more layers C+ comprising the biocompatible material with positive electrostatic charges M+ comprise a cross-linking agent R− chosen among the multiply-charged anions.

The one or more layers C− comprising the biocompatible material with negative electrostatic charges M− comprise a cross-linking agent R+ chosen among the multivalent cations.

Thus, each layer C comprises a biocompatible material M with electrostatic charges, in other words a biocompatible material bearing functional ionisable and ionised groups under appropriate physicochemical conditions. These charges may be positive electrostatic charges and then the biocompatible material, denoted M+, comprises cationic functional groups, such as amine functions for example. These charges can be negative electrostatic charges and then the biocompatible material, denoted M−, comprises anionic functional groups, such as carboxylic acid, sulfonate, alcoholate or phosphate functions for example.

Each layer C comprises a cross-linking agent R in addition to the biocompatible material M. This cross-linking agent also comprises electrostatic charges, of opposite charge to that of the material M. However, the total electrostatic charge of the layer C corresponds to that of the material M. Indeed, in the layer C, the ratio (number of electrostatic charges of the biocompatible material, denoted nM/number of electrostatic charges of the cross-linking agent, denoted nR) (i.e. nM/nR) is strictly greater than 1, advantageously greater than 2, more advantageously greater than or equal to 5.

Hence, the layer comprising the material M+, denoted layer C+, also comprises a cross-linking agent comprising negative charges, denoted R−. The layer C+ is positively charged overall. Indeed, in the layer C+, the ratio (number of positive electrostatic charges of the biocompatible material, denoted nM+/number of negative electrostatic charges of the cross-linking agent nR−) (i.e. nM+/nR−) is strictly greater than 1, advantageously greater than 2, more advantageously greater than or equal to 5.

Hence, the layer comprising the material M−, denoted layer C−, also comprises a cross-linking agent comprising positive charges, denoted R+. The layer C− is negatively charged overall. Indeed, in the layer C−, the ratio (number of negative electrostatic charges of the biocompatible material, denoted nM−/number of positive electrostatic charges of the cross-linking agent nR+) (i.e. nM−/nR+) is strictly greater than 1, advantageously greater than 2, more advantageously greater than or equal to 5.

In each type of layer C, the modulation of the ratio nM/nR, either nM+/nR− or nM−/nR+, makes it possible to modulate the stiffness of the coating 14. By way of example, when the cross-linking agent is added at a content level making it possible to have a ratio nM/nR of 5/1, a very rigid coating is obtained and when the cross-linking agent is added at a content making it possible to have a ratio nM/nR of 100/1, a much more flexible mesh is obtained.

The ratio nM/nR advantageously varies from 2/1 to 300/1, more advantageously from 5/1 to 150/1.

This system of coating 14 has the advantage of facilitating the modulation of the thickness of the layer of coating 14, and the large choice of biocompatible materials, in particular biopolymers, M+ and M−, makes it possible to modulate the mesh of biocompatible materials, in particular biopolymers at the surface, which is also stiffened by cross-linkings of greater or lesser strength of this mesh. The modulation of the stiffness of the coating 14 makes it possible to modulate the release of nutritive and/or physiologically active substances: the denser the stiffening, the more the meshing of biopolymers is reduced and the more the release is slowed down. This type of cross-linked and structured coating 14 in multiple layers C also makes it possible to obtain a structural stability necessary for the preservation of the feed 10 until its consumption and the release of nutritive and/or physiologically active substances, and in particular necessary for its handling.

The cross-linking agent R+ is chosen among the multivalent cations. Advantageously, the multivalent cations are chosen from the group consisting of alkaline earth metals, transition metals and poor metals.

Very advantageously, the multivalent cations are chosen from the group consisting of cations of calcium, magnesium, manganese, iron, copper, zinc, aluminium and the combinations thereof.

It is noted that the multivalent cations can be provided by salts which therefore also comprise an anion. What is important is that the compound used enables the release of a cation which will be able to react with the negative charges of the biocompatible material M− and hence contribute to the cross-linking of the layer C−.

The cross-linking agent R− is chosen among the multiply-charged anions. The term "multiply-charged anion" shall mean a chemical compound comprising a plurality of negatively charged functional groups. The functional group can be monovalent or multivalent. According to a preferred embodiment, the multiply-charged anions are polyphosphates. The cross-linking agent R− is preferably chosen among sodium trimetaphosphate (STMP), sodium hexametaphosphate and the mixtures thereof, preferably sodium trimetaphosphate (STMP).

Advantageously, in each layer C+, the biocompatible material M+ is a biopolymer, in particular chosen among the positively charged polysaccharides, advantageously chosen among the polypeptides, chitosan, the derivatives of chitin, gums used as amine-functionalised texturing agent such as functionalised guar gum, and the mixtures thereof. More advantageously, the biocompatible material M+ is chosen among chitosan.

Advantageously, in each layer C+, the biopolymer M+ is chitosan and the cross-linking agent R− is advantageously sodium trimetaphosphate (STMP).

Advantageously, in each layer C−, the biocompatible material M− is a biopolymer, in particular chosen among the negatively charged polysaccharides, advantageously chosen among the polypeptides, pectin, gum arabic, xanthan gum, alginates, carrageenans, cellulosic derivatives, and the mixtures thereof. More advantageously, the biocompatible material M− is chosen among the alginates, pectin and the mixtures thereof.

Advantageously, in each layer C−, the biopolymer M− is chosen among the alginates or pectin, and the cross-linking agent R+ is advantageously chosen among calcium cations.

Advantageously, in each layer C+, the cross-linking agent R− is introduced at a specific content enabling a ratio nM+/nR− to be obtained of between 5/1 and 150/1. In particular, in each layer C+, the cross-linking agent R− is introduced at a content between 0.5 g and 2 g for 1 g of M+ for high cross-linking rates, and between 15 and 70 mg for 1 g of M+ for low cross-linking rates+.

Advantageously, in each layer C−, the cross-linking agent R+ is introduced at a specific content enabling a ratio nM−/nR+ to be obtained of between 5/1 and 150/1. In particular, in each layer C−, the cross-linking agent R+ is introduced at a content between 0.5 g and 2 g for 1 g of M− for high cross-linking rates, and between 15 and 70 mg for 1 g of M−.

Advantageously, the layers C thus comprise bonds between the material M and the cross-linking agent R by metal complexing for the layer C− or chemical bridging for the layer C+.

n is an integer. n is advantageously less than or equal to 15, more advantageously between 2 and 15, and preferably between 2 and 10.

This variable number of layers C is suitable for obtaining a good compromise between encapsulation quality and controlled-release in the digestive tract while enabling easy implementation.

The outer layer of this coating 14 preferably consists of a positively charged polymer, in other words a layer C+, because this has antibacterial properties and thus improves the preservation of the feed or feed supplement.

The use of two cross-linking chemistries, metal complexing and chemical bridging chemicals, for the coating 14 makes it possible to have a trigger for releasing nutrients according to the progress in the digestive cycle. Hence, the digestion of proteins is promoted through the release in acid medium of multivalent metal ions (which are complexed with electron donors) which increases the permeability of the coating 14 with the acid present in the stomach, while slowing the release of the digesta, because the layer of polycations remains cross-linked by the phosphoramide bridges obtained by the action of the sodium trimetaphosphate (STMP). These last cross-linking points are then released by the action of alkaline phosphatase enzymes usually secreted by the liver and discharged into the digestive track by the bile. The feed or feed supplement thus releases its predigested nutrients into the digestive tract with a slower kinetics, promoting absorption efficiency and the most favourable metabolic pathways for zootechnical performance of the target animals.

Advantageously, the core 12 and/or the protein phase 11 also comprise(s) a charged polymer, or proteins with surface charges or cationic, anionic or zwitterionic surfactants.

It is also possible to specifically add charged biopolymers to the core 12 and/or the protein phase 11 in order to generate these charges. These are chosen among the anionic or cationic polymers cited above, but can also combine the charges as in hyaluronic acid.

This makes it possible to modulate the residual or free charges by adjusting the pH conditions of the medium or by adjusting the stoichiometric balance of the complexing system in the protein phase 11.

The physicochemical system is adjusted so as to obtain an excess of free amines originating from the proteins of the protein phase 11 which will be positively charged in pH conditions less than 9. This excess of positive charges is the necessary condition for depositing the first layer of anionic biopolymer C− of the coating 14.

In this case, if the physicochemical system of the protein layer 11 instead has rather an excess of negative charges, due to the balance of ingredients which constitute it, the coating 14 will start with a first layer of cationic biopolymers C+.

The coating 14 of the protein phase 11 and/or of the core 12 can also include a layer of reinforcement materials MR.

These reinforcement materials MR can be chosen from the group consisting of clays, silicas and charged fibres, and the combinations thereof.

These reinforcement materials MR have a dominance of negative electrostatic charges at their surfaces and are thus attracted by the positive surface charges of the coating 14, layer C+. A reinforcement layer can also be placed between two layers of cationic biopolymers C+.

The reinforcement materials MR are preferably a phyllosilicate and very preferably a smectite.

The use of reinforcement materials with high specific surface area, in other words a specific surface area greater than 100 $m^2$/g, can promote the interaction with the macromolecules of the coacervate which reinforces their insertion in the coating 14, while developing a large interaction surface with the incoming molecules (oxygen, oxidant molecules) or outgoing molecules (nutrients) while increasing the mean free path which is manifest by a slowing of the oxidation kinetics of the nutrients and an improved encapsulation of small molecules.

This coating 14 therefore consists of alternately positively and negatively charged layers of biopolymers C+ and C−, advantageously polysaccharides. In the stomach of the animal, the pH is acid and it is the mesh of positively charged biopolymers, layer C+, which is the most resistant to this acid pH and which ensures the integrity of the coating 14.

The layers C− of the coating are advantageously bridged by cations such as $Ca^{++}$. These bridges are dissolved in acid medium, thus when a neutral to basic medium is reached (the intestines) there is a genuine release of the assembly of layers of the coating 14. As soon as there is a breach in the coating 14, the enzymes of the bile will be able to penetrate to the core 12 and cause the release of lipids as well as their nutrients and active substances, leading very rapidly also to the release of the particles 16 of the aqueous phase, as well as their nutrients and active substances. This coating 14 therefore ensures the rapid release of all the nutrients and active substances in the region of the intestines of monogastric animals, where their absorption during their passage is most effective.

This product 10 is designed to provide nutritional balance in rapidly growing animals, which must cope with the pathogens and stress of the breeding environment. Hence, this product 10 is recommended, in the form of feed or feed supplement, in the juvenile stage of monogastric species having a high mortality: such as in poultry farming for example for chicks, or in aquaculture for alevins. The flexibility of formulation and of modulation of properties, also makes it a useful product to accompany the finishing of pre-commercial animals.

Figure 2:
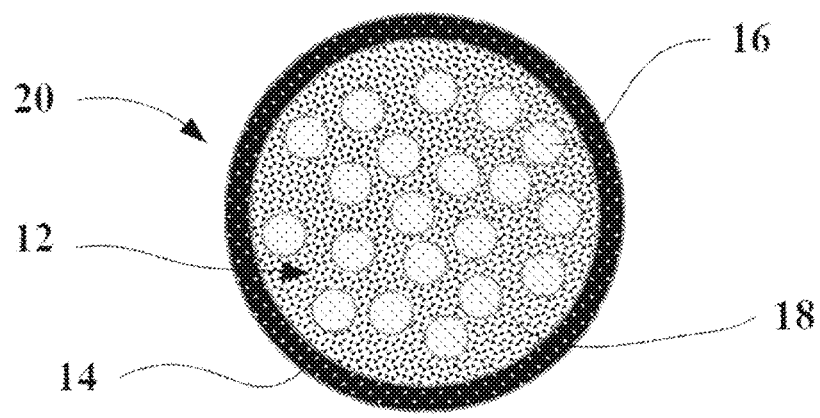
FIG. 2 schematically shows, in cross-section, a second object product of the invention.

FIG. 2 shows a second product 20 including a lipid phase 18 containing a mineral filler according to the objects of the invention.

This second product 20 is similar to the first product 10 but has a simplified structure: it does not comprise a protein phase between the core 12 and the coating 14. As with the product 10, it comprises a core 12 containing an aqueous phase composed of aqueous particles 16 dispersed in a lipid matrix 18 and a coating 14.

This second product is particularly useful for providing specific nutrients or active substances.

Figure 3:
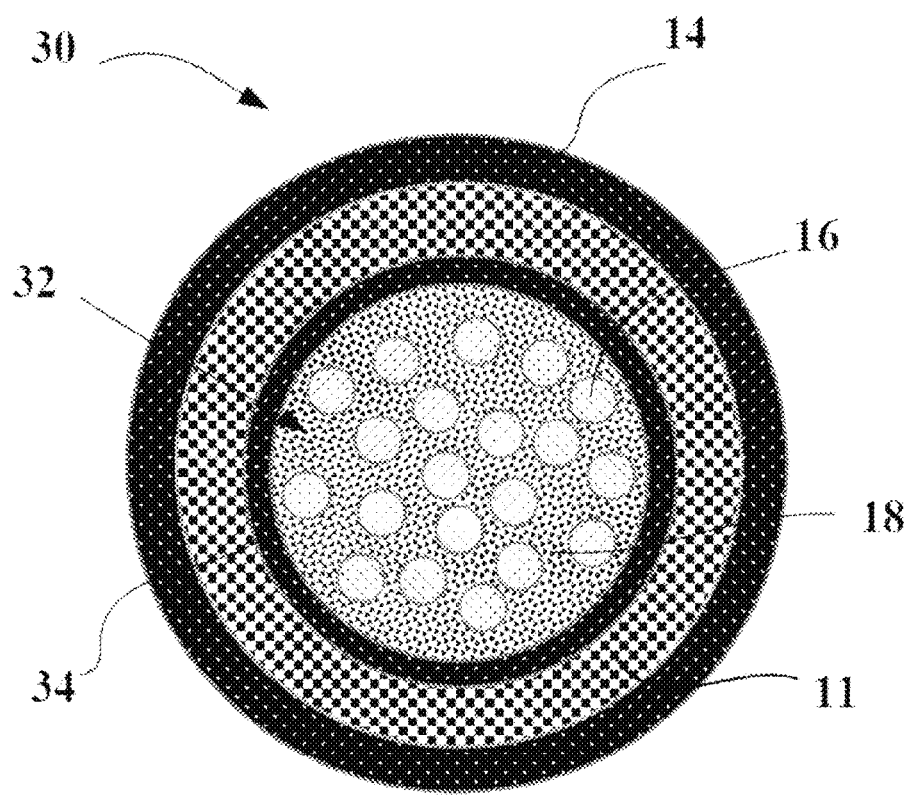
FIG. 3 schematically shows, in cross-section, a third object product of the invention.

FIG. 3 shows a third product 30 similar to the first product 10 of FIG. 1. The third product 30 also includes a lipid phase 18 containing a mineral filler according to one of the objects of the invention.

This third product 30 also comprises, relative to the first product 10, a covering or coating 34 of the lipid matrix 18 deposited between this lipid matrix 18 and the protein phase 11.

As with the coating 14 of the product 10, this covering 34 includes n layers C' of biocompatible materials M, with an alternate stacking of positive and negative charges forming structured coacervates by stacking of layers, n being equal to at least 1. Preferably, the number of layers n is between 2 and 10. n is an integer. The layers C' respond to the same definitions as the layers C described above. The biocompatible materials M are as previously described for the coating 14.

More particularly, this covering 34 includes n layers C' of biocompatible materials, with an alternating stacking of positive and negative charges forming cross-linked and structured coacervates by stacking of layers, n being equal to at least 2. This covering 34 thus comprises at least one layer C'+ responding to the same definition as the layer C+ previously described for the covering 14 and at least one layer C'− responding to the same definition as the layer C− described above for the covering 14. Preferably, the number of layers n is between 2 and 10. n is an integer. The biocompatible materials M are as previously described for the coating 14, in other words as described for M+ and M−.

This addition of the covering 34 makes it possible, if necessary, to slow down the release of the active components of the internal phase of the core 12. The outer layer of this covering 34 preferably consists of a positively charged polymer, layer C+, because this has antibacterial properties and thus improved preservation of the feed or feed supplement.

This third architecture can respond to the requirements of even more delayed release of the core in the digestive tract, such as the release of prebiotics or probiotics which must remain integral until the terminal phase of the digestive tract.

Figure 5:
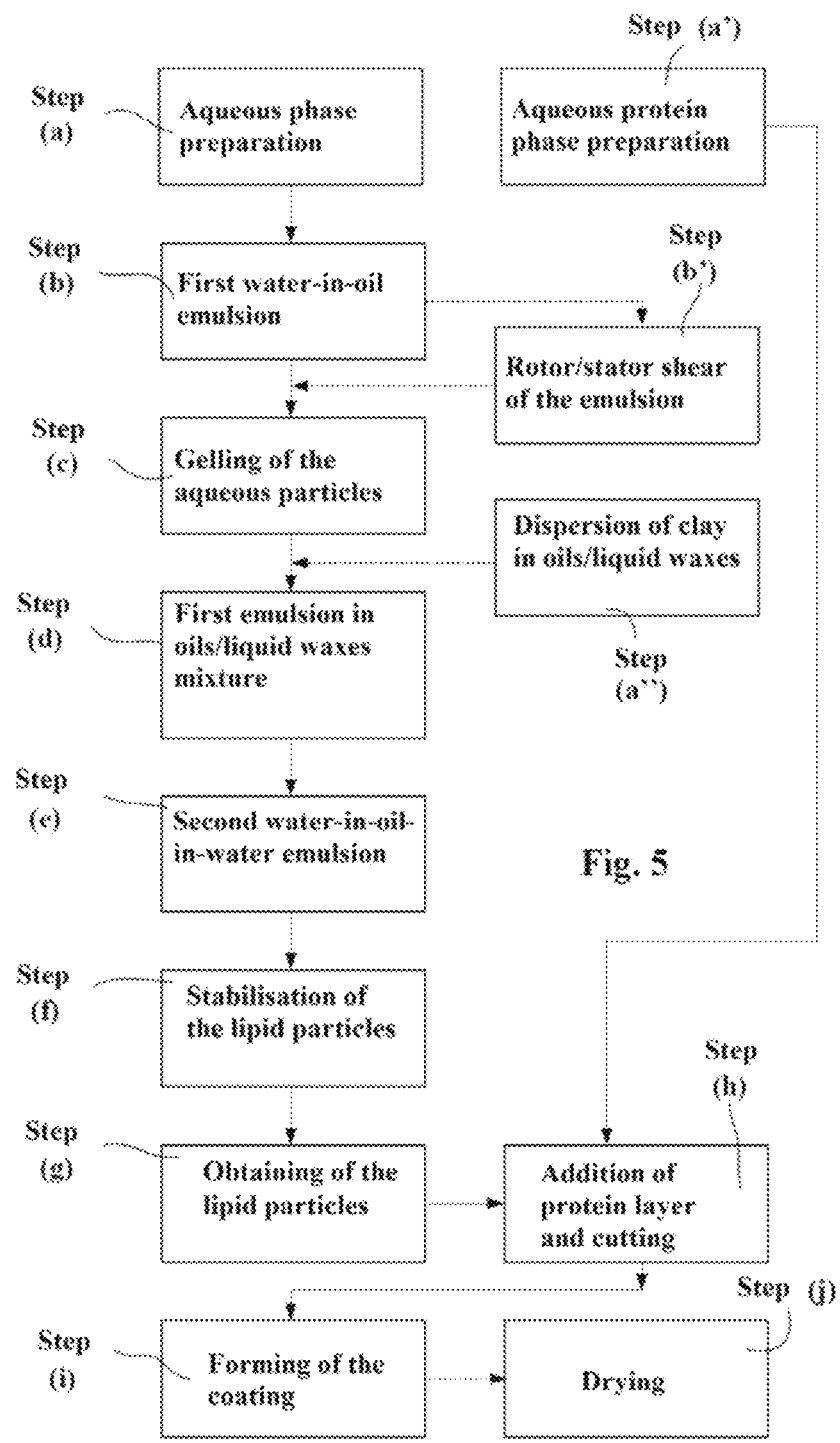
FIG. 5 shows a scheme of a method for manufacturing the first product.

FIG. 5 shows the various steps of a method for manufacturing the first product 10.

The core or cores 12 of the first product 10 are prepared from a double water-in-oil-in-water emulsion followed by filtration or decanting. Then this core 12 is completed by a protein phase 11 which will be shaped to the target size and geometry A coating 14 is then produced. The last, optional step for preparing the products is a drying in order to bring the moisture content of the products 10 to a value of less than 10 wt %, relative to the total weight of the product 10. This drying is carried out at low temperature, preferably less than 50° C., for example between 18° C. and 40° C.

Step (a) consists of preparing an aqueous phase by dispersing the necessary water-soluble active substances in water and adding the gelling reagents. These reagents are as described above for the aqueous phase A gel and can be a polysaccharide, a calcium salt, in particular calcium sulfate or calcium carbonate, in the presence of pyrophosphate or glucono-delta-lactone.

Step (a') consists in preparing a gelled protein phase gel 11 by dispersing proteins in water with gelling reagents, optionally an osmotic agent and optionally mineral fillers such as phyllosilicates.

In step (b), the aqueous phase originating from step (a) is injected into a vegetable or animal oil in order to obtain a first emulsion of aqueous particles in oil.

Then, in step (c), this first emulsion is left to rest or moderately heated, to less than 100° C. and ideally to less than 60° C., for example from 40° C. to 60° C., in order to complete the gelling reactions of the aqueous particles and to obtain robust gelled aqueous particles dispersed in oil (step (c)).

The first emulsion originating from step (c) is then added to a mixture of at least one animal or vegetable oil and at least one liquid wax prepared beforehand. The oil+wax mixture advantageously comprises from 1 to 50 wt % wax relative to the total weight of the mixture, more advantageously from 5 to 15 wt % wax. In order that the crystallisable waxes used are liquid, the temperature of the mixture is greater than the melting temperature of the waxes (step (d)).

In step (e), whole of the first emulsion and of the mixture of at least one oil and at least one liquid wax, originating from step (c), is introduced into an aqueous solution under stirring in order to obtain a second emulsion; this second emulsion includes the gelled aqueous particles of the first emulsion dispersed in a lipid matrix which is itself in the form of particles dispersed in the aqueous solution.

In step (f), this second emulsion originating from step (e) is cooled to a temperature lower than the solidification temperature of the crystallisable waxes that are present for stabilising the lipid particles.

It remains, in step (g), to isolate the cores or lipid particles of the products by filtration or decanting, eliminating the aqueous phase.

After step (g), the lipid particles originating from step (g) are dispersed in the protein phase 11 during gelling prepared in step (a'). The homogenisation is made with the minimum of shear, the shear obtained for example by manual stirring (step (h)). The dispersion is then, for example, introduced into a cold extruder for shaping the product through a die. At the outlet of the die, the extrudate is continuously cut with a rotating blade to the target dimensions and assemblies are obtained consisting of cores 12 coated with a protein phase 11 ready to be coated.

This addition of the protein phase 11 can also be carried out in a fluidised bed or by spheronisation.

The chosen methods, extrusion, fluidised bed, spheronisation, are implemented at low temperature, less than 50° C. (step (h)), for example and ranging from 18° C. to 50° C.

Observation: the gelling kinetics of the protein phase 11 is adjusted in order to make it possible to carry out all of the operations of step (h). The gelling is only achieved at the end of step (h) after a resting time enabling the solidification of the layer.

It is to be noted that because of the method of manufacture by preparation of emulsions, the aqueous phases 16 and the lipid particles 18 have a relatively spherical geometry. By contrast, the assemblies consisting of the protein phase 11 surrounding the lipid phase 18 of the products 20 obtained by cutting the extrudate coming from a die can take any shape.

Finally, in step (i), the coating 14 is formed of the assemblies consisting of the protein phase 11 surrounding the lipid phase 18 originating from step (h) by immersions in a water bath, in which solutions of cationic M+ and anionic M− biocompatible materials will be alternately provided.

After the coating of step (i), the products are advantageously dried by an air flow at low temperatures, less than 50° C. and preferably between 18 and 40° C. in order to bring the moisture content to a value of less than 10 wt %, relative to the total weight of the product. This makes it possible to increase the duration of preservation of the products. This last step (j) is optional.

Figure 4:
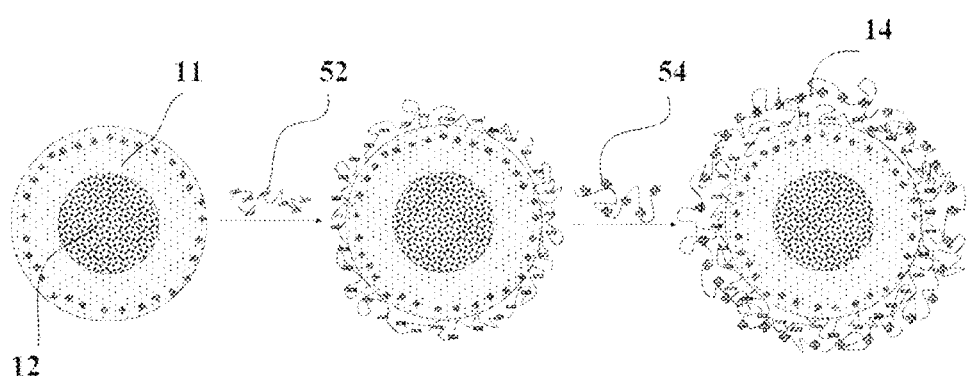
FIG. 4 schematically shows an embodiment of a coating of the core of an object product of the invention.

FIG. 4 shows this formation of the coating 14 of the assemblies consisting in the protein phase 11 surrounding the lipid phase 18 originating from step (g) by successive additions of positively M+ and negatively M− charged biopolymers, advantageously polysaccharides.

Observation: the representation of the protein phase 11 of FIG. 4 has been modified with respect to that of the other figures for reasons of clarity.

Observation: the assembly is shown schematically here in the form of a particle, but it can have any shape.

On the left of FIG. 4 there is an assembly consisting of a core 12 of the first product 10 surrounded by a protein phase 11. This protein layer 11 comprises positive or negative free surface charges.

This assembly is coated by the addition of an aqueous solution of negatively charged biopolymers 52 (M−), for example polysaccharides.

Through electrostatic interactions, the negatively charged biopolymer M− will cover the surface of the assembly in order to form a negative layer C− of coacervate.

An aqueous solution of positively charged biopolymer 54 M+ is then added in the dispersion with the particles now negatively charged at the surface. This will then spontaneously cover the previously disposed layer C−.

The operation is repeated alternating the aqueous solutions of positively charged M+ and negatively charged M− biopolymers, until a coating 14 is obtained containing the desired number n of layers C. Usually, n is between 2 and 10.

Advantageously, in step (e), the continuous aqueous solution in which the second emulsion (emulsion of lipids with wax) is produced, contains at least one osmotic agent and at least one surfactant.

The osmotic agent can be chosen from the group consisting of sugars, salts, water-soluble polymers preferably of molecular weight less than 150 kg/mol and the combinations thereof.

A preferred choice can be sorbitol with a content of less than 5 wt % relative to the weight of the continuous aqueous solution, so that the final product is not indigestible. A content between 0.8 wt % and 1.5 wt % sorbitol is optimum. Advantageous use of Guérande salt is also possible, which can also brings useful mineral salts.

The presence of an osmotic agent has the advantage of putting in place an osmotic barrier which prevents the passage of active substances present in the aqueous phase of the first emulsion which also contains an osmotic agent, of the same type or different from that of the outer continuous phase, advantageously among those previously described; this inner aqueous phase being itself dispersed in the lipid phase. The osmotic agent ensures an osmotic pressures balance. This avoids a pumping effect of nutrients through the lipid wall.

The protein phase 11 also contains an osmotic agent, of the same type or different from that of the outer continuous phase, advantageously among those previously described. This reinforces the efficacy of the osmotic barrier.

Very advantageously, the surfactant is chosen from the group consisting of phospholipids, polymers such as carboxymethyl cellulose (CMC), hyaluronic acid, polylysines, proteins such as casein or the hydrolysates of vegetable or animal proteins, surfactants, and the combinations thereof.

FIG. 5 also shows an additional and optional step (a″) where a dispersion of a mineral phase such as clays is produced in at least one part of the mixture of at least one oil and at least one liquid wax, animal or vegetable oils and liquid waxes used in step (d). As previously indicated, these clays are preferably phyllosilicates and very preferably smectites.

In order to facilitate the exfoliation of the sheets of clays in this lipid medium, the dispersion is carried out in the presence of a surfactant, which preferably has a polar head with a cationic function.

Advantageously, lecithin, betaine, polylysine and the combinations thereof can be used.

FIG. 5 also presents another additional and optional step (c′) where, after having obtained the first emulsion of aqueous particles in oil (step (b)), it is subjected to a high shear such as a rotor/stator in order to homogenise and reduce the size of these aqueous particles before their complete gelling. This shear is preferably between 2000 and 20,000 min$^{-1}$.

The fabrication of the second product 20 is similar to that of the product 10; a coating is produced directly after having obtained the lipid particles in step (g).

Figure 6:
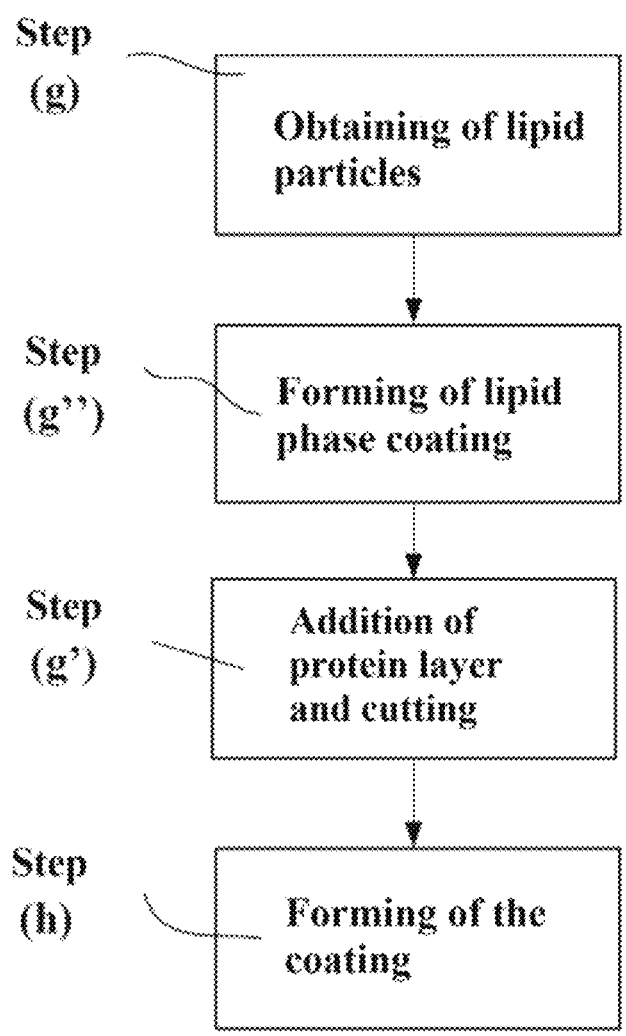
FIG. 6 shows a scheme of the additional steps for manufacturing the third product.

FIG. 6 shows the additional steps for the preparation of the third product.

After step (g), which makes it possible to obtain the lipid particles 18 by filtration or decanting, a coating 34 of these lipid particles 18 is formed by successive additions of biopolymer solutions, advantageously positively charged M+ and negatively charged M− polysaccharides (step (g′)). The last addition is preferably that of a positively charged M+ biopolymer. The steps for forming this coating 34 are as previously described for step (i).

Then, the coated lipid particles 18 obtained in this way following step (g′) are dispersed in a protein phase 11, and the assembly is shaped by cold extrusion. The addition of particles in the protein phase 11 can also be made by deposition in a fluidised bed or by spheronisation. Cylinders or other geometries (according to the die used) of protein phase 11 are obtained in which the lipid particles 18 are dispersed. It is then necessary to cut these extrudates, for example with a rotary blade, in order to obtain the assemblies of cores 32 coated with the coating 34 dispersed in a protein phase 11 of the third products (step (h)).

It remains to produce the coating 14 in order to obtain these third products 30. This coating 14 is produced as previously described.

A last optional step of drying can then be carried out as previously described under a flow of air at low temperature, preferably less than 50° C., for example between 18 and 40° C., until reaching a moisture content less than 10 wt %, relative to the total weight of the product.

Characterisation of Exfoliated Mineral Fillers (Clays)
Small-Angle X-Ray Scattering (SAXS)

Small Angle X-ray Scattering (SAXS) is a technique for gaining information on the structure of the material, on scales ranging from approximately 1 to 100 nm. Scales on the order of a micron can also be probed by USAXS. Furthermore, this technique enables the study of concentrated media. This technique consists in sending a beam of x-rays onto a sample and measuring the spatial distribution of the scattering produced by the sample. The measured intensity is then a function of the structural organisation of the material, more precisely, of the phase contrast. It is proportional to the electron density difference.

Figure 15:
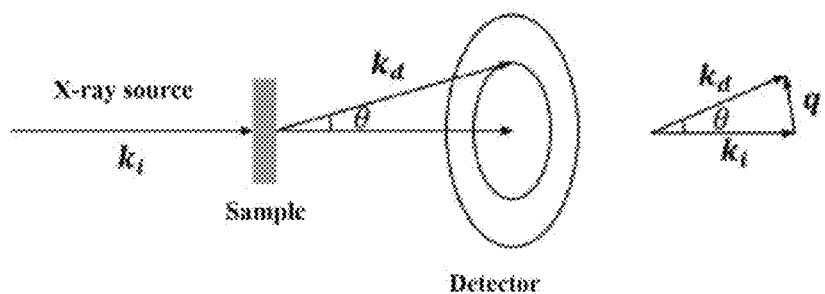
FIG. 15 shows the basic diagram for small angle scattering.

A beam of x-rays illuminates a sample to be analysed. The photons of the beam interact with the electron clouds of the atoms of the sample and are scattered by the sample. A detector, placed behind the sample, can measure the scattered intensity as a function of the scattering angle (cf. FIG. 15).

The direction of the scattering angle θ is also called the scattering vector (q). The dimension of the scale studied is inversely proportional to the scattering vector. The scale observed is as large as the scattering vector is small.

The scattered intensity is written as a function of the shape of the objects (shape factor P(q)) and the correlation of the objects (structure factor S(q)) as follows:

$$I(q) = \alpha \cdot \varphi \cdot (\Delta\rho)^2 \cdot P(q) \cdot S(q)$$

with: α: constant (–); φ: volume fraction of the sample; Δρ: contrast difference between the objects and the solvent.

Apparatus

The apparatus used for the analyses is a Xeuss 2.0, operated at the Laboratoire Léon Brillouin of the CEA (Saclay, France). It uses a microfocused CuK alpha source; of wavelength 1.54 Angström and power 8 keV. The 2D detector is a Pilatus 3 1M from Dectris (Switzerland).

Two configurations make it possible to cover a large range of scattering vector, 0.003 Angstrom-1<q<1 Angstrom-1, by positioning the detector at 2.494 m (beam of 0.3×0.3 mm$^2$), then at 0.539 m (beam of 0.8×0.8 mm$^2$). The signals are normalised in order to obtain intensities in cm-1 and to be quantitative in the analyses which are carried out.

Sample Preparation:

The efficient exfoliation of the bentonite in lipid medium (sunflower oil was used for the SAXS experiments) requires following a protocol which promotes the three important steps of the dispersion process for these clays:

(1) Pre-swelling of the phyllosilicate sheets
(2) Adsorption of a hydrophobic molecule at the surface of the phyllosilicate particles, in order to make it compatible with the dispersion lipid phase
(3) The application of shear energy in order to separate the phyllosilicate particles in the continuous lipid phase.

Step (1) is obtained by the addition of water in sufficient quantity to impregnate the sheets. The protocols followed recommend using at least 10% water relative to the quantity of bentonite used, this quantity being able to be increased in order to improve the quality of the exfoliation, the samples prepared for characterisation by SAXS were pre-swelled with 0.5 g of water for 1 g of bentonite.

Step (2) is obtained by the use of lecithin as an exfoliant, which will be adsorbed on the surface by ionic interaction. For the SAXS characterisations, 0.3 g of lecithin was used for 1 g of bentonite. It was pre-dissolved in water in step 1 in order to facilitate its incorporation.

Step (3) can be obtained by various effective shearing or dispersion means. The SAXS samples were obtained by dispersion of the pre-impregnated bentonite (step (1) and (2)) in sunflower oil. The minimum preparation volume being 200 ml, a shear was applied in batch mode, at ambient temperature, in an air gap of 150 μm with a 30 mm stirrer, at 4000 rpm for 5 minutes.

For the purposes of the experiment, 20 wt % and 8 wt % solutions of bentonite were prepared in sunflower oil.

Results and Interpretation

Figure 16:
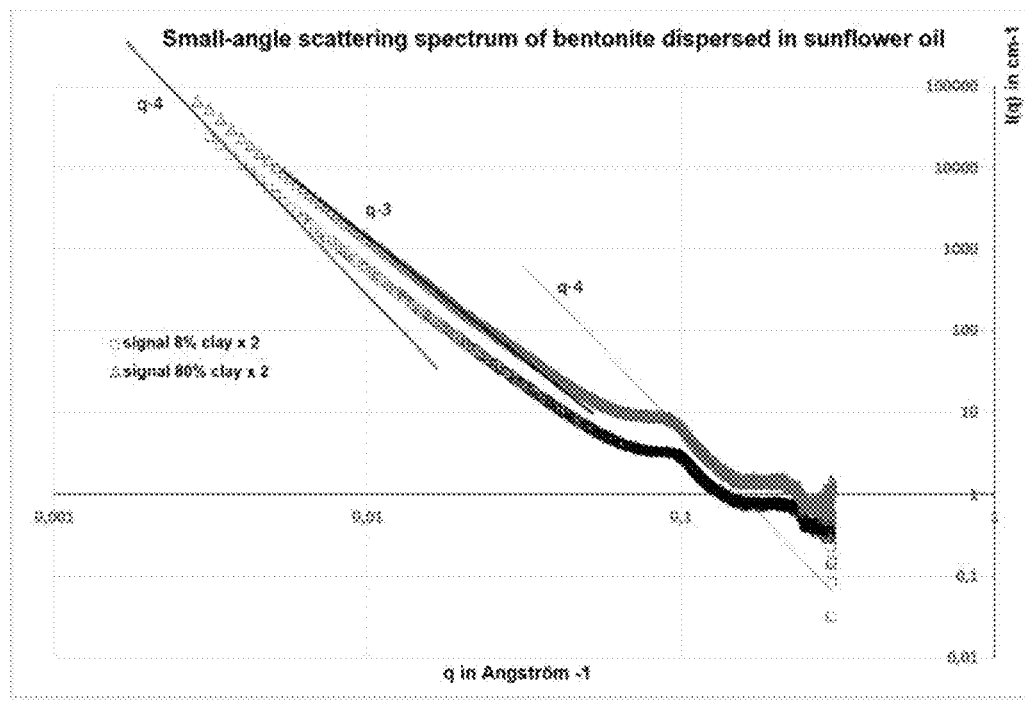
FIG. 16 shows the spectrum for small angle scattering of bentonite dispersed in sunflower oil.

The 20 wt % and 8 wt % bentonite solutions were measured with SAXS, and the spectra of FIG. 16 were obtained.

The measured spectra show an organisation of the bentonite on multiple scales. The signals are proportional to the quantity of dispersed bentonite, and have the same appearance. Shoulders are observed at high q, which can be interpreted as a characteristic distance of the material (peaks in the structures) corresponding to a characteristic distance of 63 Angström (2×π/q) for the first shoulder and 28 Angström for the second shoulder. This can be characteristic of an inter-sheet distance in swollen or unswollen bentonite clusters. We can interpret the shoulders as saying that the quantity of water provided in the preparation of the samples has not enabled the swelling of all of the bentonite, and that there remain swollen bentonite particles which are not entirely exfoliated in the sample.

The rise with a small scattering vector (q→0) is the characteristic signal of a fractal structure, tending towards a slope in q−4, which makes it possible to envisage a first size of macroscopic objects, the dimension of which can be estimated to be of about fifty nanometres (start of Guinier signal in I(q) α exp(−q$^2$Rg$^2$/3)).

For 0.008<q<0.08, a slope in q$^{-3}$ confirms the fractal structuring of the bentonite, which is organised both in the form of compact clusters (usually giving signals in q$^{-4}$) and elongate structures or connection paths (percolation paths) between the clusters, giving a signal in q$^{-2}$. The combination of these two signals justifies the fractal dimension in q$^{-3}$, which will be called a fractal aggregate.

Figure 17:
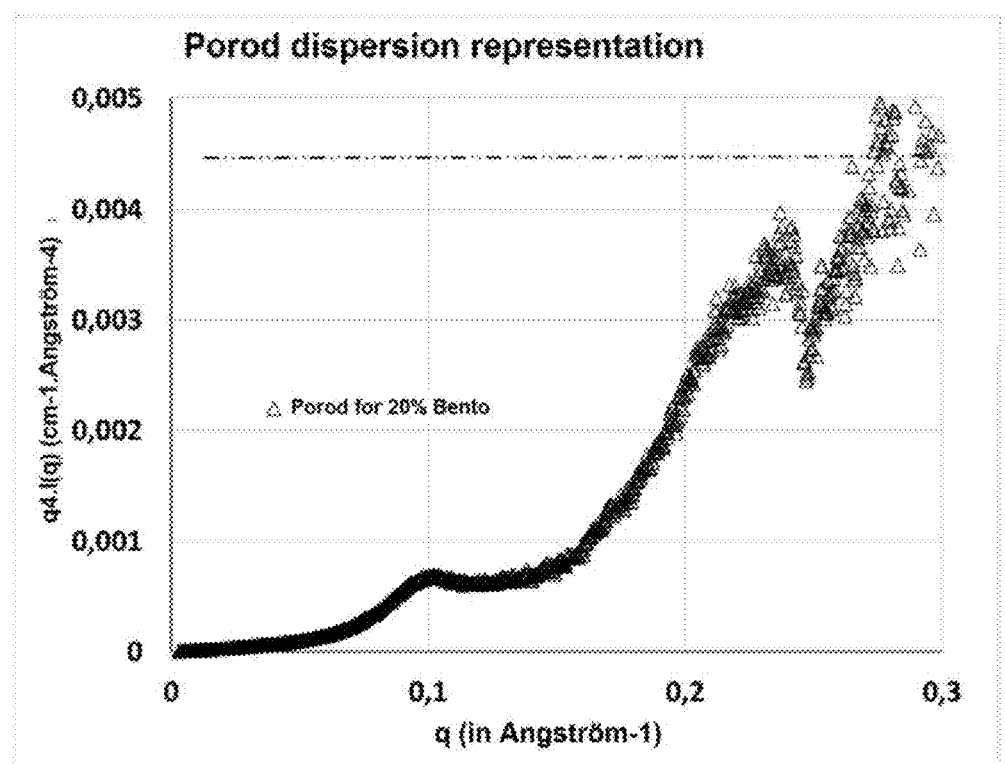
FIG. 17 shows SAXS data for dispersions of bentonite in Porod $Iq^4=f(q)$ representation.

Furthermore, the SAXS data of the bentonite dispersions in Porod Iq$^4$=f(q) representation promoting the reading of the large scattering vector signal (large q) makes it possible to also have a more qualitative approach, by determining the specific surface area (cf. FIG. 17).

This representation is commonly used for studying a two-phases medium and evaluating its interfacial properties. In the model case of fractal aggregates, the Porod plateau characterises the scattering surface area of the aggregates. In the present case, in this representation we can evaluate the net scattering surface area of the bentonite aggregates as they are organised in the lipid phase. We focus on the 20 wt % bentonite signal, because the signals are perfectly parallel with the 8 wt % bentonite (cf. FIG. 17).

This shows the two characteristic regimes of a Porod representation spectrum, with an increasing variation of the intensity in the order of increasing scattering vectors followed by a plateau, which take shape around 0.3 Angström-

1. The scattering vectors from which $Iq^4$ is constant is disturbed here by an oscillation caused by the presence of the structure peak at 28 Angström described in the preceding spectrum. Therefore, the Porod signal at $4.41 \cdot 10^{-3}$ cm-1 can be projected when q tends towards 0.3 Angström-1.

The appearance of the Porod Plateau from q=0.25 Angström-1 makes it possible to calculate the specific surface area studied on the scale of the bentonite particles, being sensitive to the quality of the exfoliation, on the scale of the bentonite clusters as dispersed.

Hence, it can be written $$\mathrm{Lim}(I(q) \times q^4) \text{ if } q \to \infty = (2\pi \times (\Delta \rho)^2) \times (\text{Surface/Volume})$$

With Surface being the specific surface area.

The contrast $\Delta \rho$ between the bentonite and the sunflower oil has been calculated as: 0.335.E-5 Angström-2

The volume fraction of the 20 wt % bentonite solution (with bentonite density=2.2, and sunflower density=0.94) has been converted: 9.65 vol %

This enables the specific surface area of the exfoliated bentonite to be determined in a liquid medium as 285 $m^2/g$.

Since the specific surface area of the raw bentonite is of about 10 to 70 m2/g, always less than 100 m2/g, these results show the importance of the exfoliation for the quality of the interactions between the sheets of bentonite and, in particular, the oxygen molecules capable of migrating into the products. In particular, the preceding results show that the method of exfoliation in a lipid matrix leads to a good exfoliation, and that an interconnected three-dimensional organisation of clay particles is observed, until percolation.

This exfoliation process can be applied to other clays and in particular to all the phyllosilicates.

Preparation of a Feed Supplement

An example of preparation of a feed supplement of the first product is now described.

Preparation of the Inner Gelled Aqueous Phase

This preparation comprises the following steps:

A beaker is filled with water. Then the hydrophilic supplemental nutrients to be encapsulated are added. These supplemental nutrients represent of about 30 wt % relative to the weight of the water placed in the beaker. The solution is then mixed in a high-shear rotor-stator type mixer, Silverson L5M-A, for 1 minute at 1000 rpm (revolutions per minute). Then, 3.5 wt % sodium alginate is added to the preceding solution. Mixing takes place with the high-shear mixer for 5 minutes at 2000 rpm. After complete dispersion of the alginate above, 0.5 wt % pyrophosphate and 1.75 wt % calcium sulfate are added simultaneously. The mixture is rapidly homogenised in the rotor-stator mixer at 2000 rpm, then the entirety of this aqueous phase is poured into a volume of cod liver oil acting as dispersion medium. The ratio of the volume of oil to the volume of the aqueous phase is less than 3.4. The assembly is strongly mixed with the high shear mixer at 2000 rpm in order to reduce the size of the water droplets in the oil before gelling of the aqueous phase. It is left to stand for 15 minutes so that the aqueous phase particles solidify.

Figure 7:
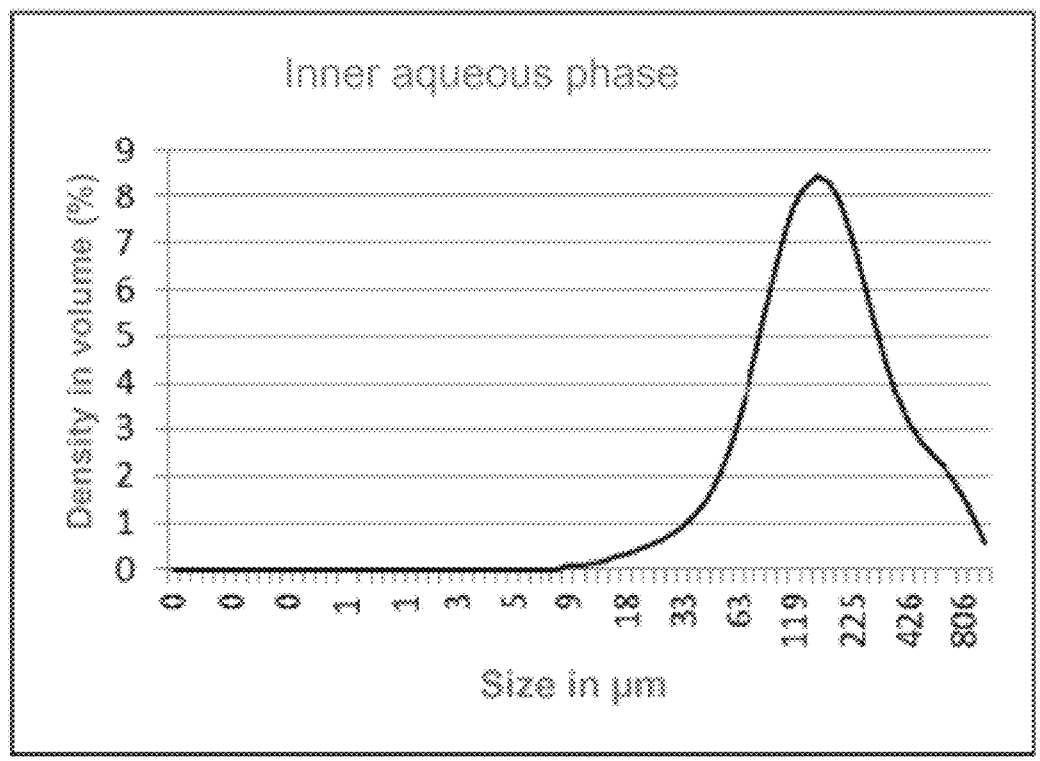
FIG. 7 shows the size distribution of the aqueous particles.

FIG. 7 shows the size distribution of the gelled aqueous particles obtained. The average size of the aqueous phase particles obtained with the shear speed at 2000 rpm is 161 µm. The average size can be reduced by increasing the shear rate of the solution, or by changing the viscosity of the alginate solution. By reducing the concentration of alginate in the solution from 3.5 wt % to 2 wt %, a reduction in viscosity of more than a factor of 10 was obtained. The shear is then more efficient and the average size of the particles decreases.

Preparation of the Crystallisable Lipid Phase

Preparation of a First Beaker of Molten Wax

A given mass of beeswax or sodium stearate, and a mass of sunflower oil greater than 15% of the mass of the beeswax or sodium stearate, are added to a first beaker. The sum of the two ingredients represents 25.5 wt % of the total mass of the lipid phase prepared. Then, the first beaker is placed in a preheated water bath at 75° C. until the wax is totally melted (melting temperature of the wax from 60 to 63° C.).

Preparation of a Second Beaker of Exfoliated Clay in Oil

In a second beaker was added 100 weight units of rape seed oil, 30 weight units of linseed oil, 1.24 weight units of betaine citrate, 1.24 weight units of soya lecithin, 50 weight units of montmorillonite preimpregnated with 10 wt % water relative to the weight of the montmorillonite (this exfoliation protocol carried out with 10% water has been optimised for the SAXS characterisations with 50% water). The assembly is mixed with the high-shear mixer for 30 minutes at 2000 rpm. The mixture is completed with specific supplements such as vitamins A, E, D, K etc. at less than 0.2 weight units. The exfoliated clay preparation represents of about 30 wt % relative to the total mass of the prepared lipid phase. The quality of the exfoliation of the montmorillonite in oil can be evaluated by optical microscopy by observing the homogeneity of the dispersion, with the reduction of microscopic aggregates of several hundreds of µm.

Combining the Prepared Lipid Phases in a Third Beaker

In a third beaker, held in the water bath at 70° C., the prepared oil phases are combined, according to the following proportions:

44 wt % of the dispersion of gelled aqueous particles in a previously prepared cod liver oil lipid matrix;

31 wt % of the mixture of the second beaker (rapeseed and linseed oil, exfoliated montmorillonite, etc.); and 25 wt % of the previously prepared mixture of liquid waxes and sunflower oil.

This is homogenised with a high-shear mixer for 2 minutes at 1000 rpm. An oil phase is obtained that is ready to be dispersed to form the enriched lipid particles.

Preparation of the Outer Aqueous Phase

An aqueous solution is prepared in a jacketed reactor, equipped with a stirrer and a temperature control, according to the following composition:

a volume of water equivalent to 2.5 times the volume of lipid phase to be dispersed;

1 wt %, relative to the mass of the aqueous solution, of osmotic agent (sorbitol or sodium chloride); and 0.4 wt %, relative to the mass of the aqueous solution, of casein (surfactant, able to be substituted by animal or vegetable proteins).

This is homogenised until achieving the perfect solubilisation of ingredients, and the solution is heated to 65° C.

Production of Lipid Particles

Using a stirrer that is capable of dispersing the solids, the continuous aqueous phase is stirred at 450 rpm while maintaining the temperature at 65° C. Then, the entire previously prepared lipid phase held at 70° C. is poured rapidly into the outer aqueous phase. The dispersion is allowed to stabilise until reaching approximately 62° C., stirring is reduced to 400 rpm, cooing with the reactor jacket to reach 60° C., stirring is reduced to 350 rpm, cooling is accelerated by adding ice water in order to rapidly reach 45° C., the lipid particles are left to cool to ambient temperature via the reactor jacket while maintaining stirring at 150 rpm.

Figure 8:
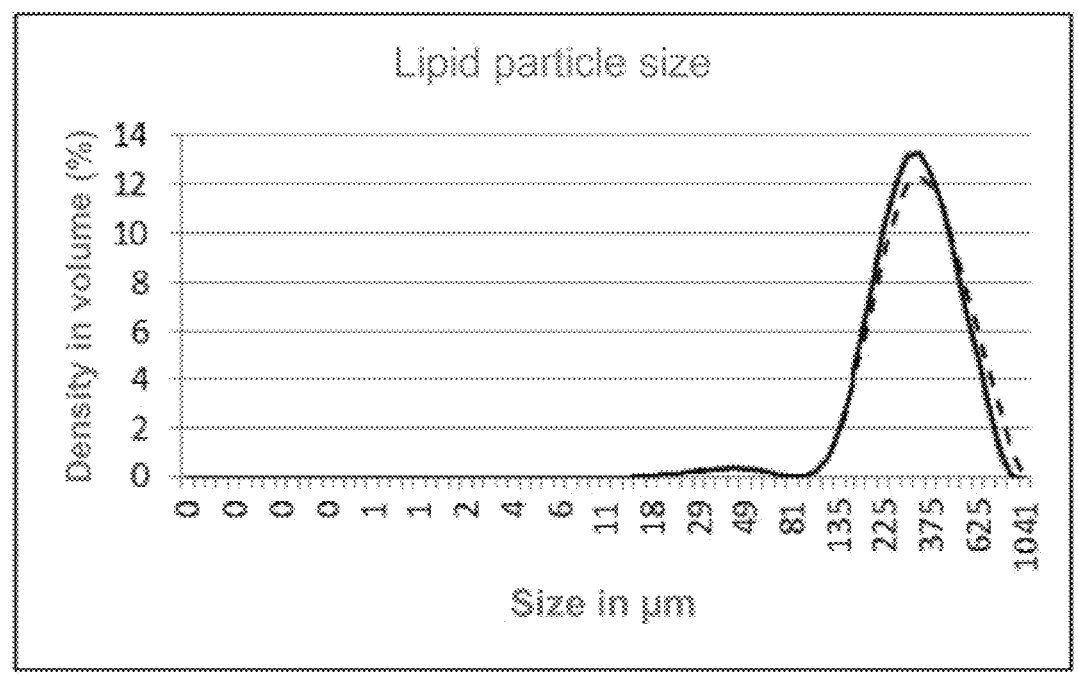
FIG. 8 shows the size distribution of the lipid particles.

When the dispersion is at less than 25° C., the solidified lipid particles are filtered on a sieve The lipid particles thus obtained are characterised by size using a Malvern Mastersizer 3000 particle size analyser with a liquid dispersion prepared by the hydro EV, with the software of the size determination apparatus (Fraunhöfer equation). The measurements have been conducted on 3 manufacturing tests: the three tests giving the same average size of lipid particles of 330 µm (FIG. 8).

Figure 9:
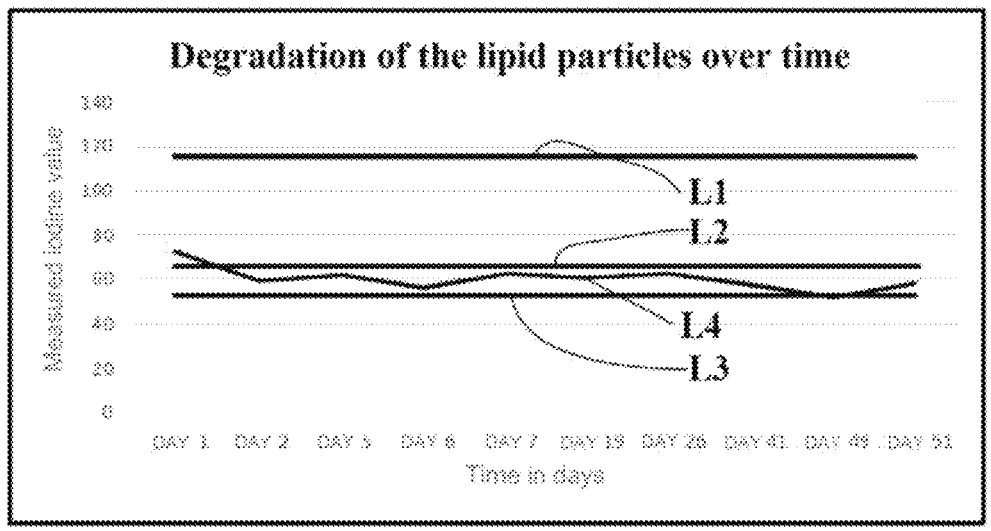
FIG. 9 shows the change over time in the iodine value measured during ageing of lipid particles in the open-air.

FIG. 9 shows the change over time in the iodine value measured according to standard NF EN ISO 3961 (September 2013), during ageing of lipid particles in the open air. Line L1 gives the reference iodine value obtained from the formulation of the particles. Lines L2 and L3 give the upper and lower 95% limits and line L4 is the change over time of the measured iodine value of the lipid particles. This line, L4, shows that all the measurements after the first lie within the interval between the high and low confidence limits and this makes it possible to confirm the storage stability of the particles, in particular due to the increase in the mean path of the oxygen molecules imposed by the presence of clay. Hence, during storage, significant variation is observed in the number of unsaturations (double bonds originating from omegas 3-6 and 9) provided by the oils used for the formulation.

Figure 10:
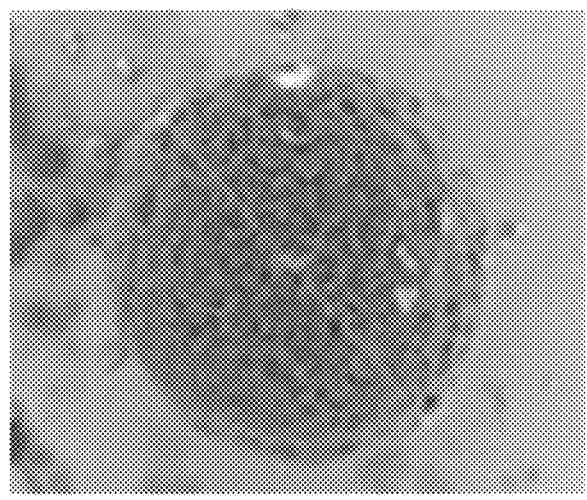
FIG. 10 shows an image of a lipid particle obtained with a scanning electron microscope.

FIG. 10 shows an image of a lipid particle obtained with a scanning electron microscope.

Outer Protein Layer—Preparation of the Protein Layer by Covering Lipid Particles Preparation of the Protein Matrix Containing the Lipid Particles Into a kneading-type planetary mixer was introduced
100 parts by weight of the formulation of proteins corresponding to the nutritive requirements of the target species;
33 parts by weight sodium alginate;
8.3 parts by weight pyrophosphate;
33 parts by weight calcium sulfate;
1 part by weight sorbitol (osmotic agent)
nutritive additives according to the nutritional target (quantity less than 2 parts by weight).

After homogenising the solids, a volume of water is added, the mass of which corresponds to 600 parts by weight and vigorous homogenisation then takes place with the kneading-type planetary mixer for 10 minutes.

A mass of lipid particles is introduced, corresponding to 630 parts by weight. Observation: it is necessary to take into account the residual moisture content of the lipid particles which can vary from 2 to 50 wt %. Then homogenising continues, limiting the shear until a homogeneous paste is obtained. This paste is then introduced into a single-screw cold extruder in order to shape the paste through a die with the target diameter of the size of the feed supplement. The extrudate is continuously cut by a rotating blade to the target size of the feed supplement.

The protein particles are left to rest for two hours in order to solidify.

The solidification kinetics of the feed were characterised with an ARES-G2 rheometer from TA-instrument, with a moving cone and plate of 40 mm$^2$. A rotational shear of 5° has been applied at a frequency of 1 Hz, and the change in the force over time was measured.

Figure 11:
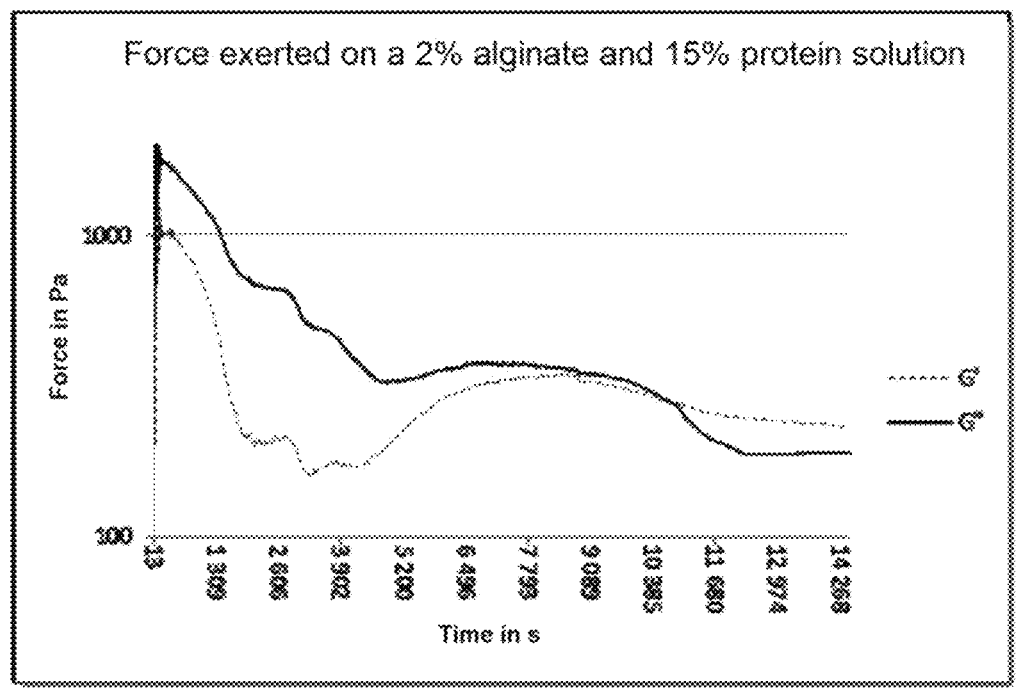
FIG. 11 shows a curve following the rheological behaviour of a protein layer.

FIG. 11 shows a curve monitoring the rheological behaviour of the protein layer in the case of a protein phase obtained with 2 wt % alginate and 15 wt % proteins relative to the total weight of the protein phase. This FIG. 11 shows the change over time of the measured moduli G' and G".

At short observation times, a destruction of the polyelectrolyte/protein gel is observed, with a reduction in the shear force G', marking a plurality of levels. There is then a return of the force beyond 3800 seconds, indicating the emergence of a cross-linking domain percolating between the two shear plates. This cross-linking appears to saturate at 8300 seconds, then there is a regression probably linked to the separation of the solidified sample from the wall of the cone/plate.

From this, it is deduced that the mixture can be worked for approximately one hour without risking destroying the gelling mechanism, and with two hours of consecutive rest the maximum level of rigidity of the feed supplement is attained. The protein particles obtained in this way can be stored chilled (4° C.), or used for the coating step by depositing the biopolymer layer by layer.

Figure 12:
FIG. 12 shows an example of protein particles obtained after gelling.

FIG. 12 shows an example of protein particles obtained after gelling, with a size in the millimetre range.

Preparation of the Coating for Modulating Release by a Biopolymer Deposited Layer by Layer Coating Layer by Layer The procedure is described for 100 g of lipid particles dispersed in 300 g of water supplemented with 1% sorbitol.

A stirrer is used promoting good homogenisation without inducing an excessive shear of the solution (double-bladed stirrer).

Preparation is as follows:
2000 ml of a first aqueous solution of chitosan (M+) at 0.1 wt % relative to the weight of the aqueous solution (with 0.05 wt % acetic acid);
2000 ml of a second aqueous solution of sodium alginate (M−) at 0.1 wt %;
200 ml of a third aqueous solution of calcium chloride (R+) at 2 wt %; and
200 ml of a fourth aqueous solution of STMP (R−) at 0.5 wt %.

Observation: the TSTP is obtained by chemical bridging of the STMP which is the reactant introduced.

First, the 0.1 wt % sodium alginate solution is added; stirring takes place for 1 to 2 minutes between each addition. Then, the chitosan solution is added.

The procedure followed and the proportions of each addition are as follows (all the % are wt %):
+20 ml of 0.1% sodium alginate solution;
+20 ml of 0.1% chitosan solution;
+60 ml of 0.1% sodium alginate solution;
+20 ml of 0.5% STMP solution;
+10 ml of 0.1% chitosan solution;
+10 ml of 2% calcium chloride solution;
+4.25 g of montmorillonite;
+100 ml of 0.1% chitosan solution;
+80 ml of 0.1% sodium alginate solution;
+20 ml of 0.1% chitosan solution; and
+20 ml of 2% calcium chloride solution.

It is stirred for 15 minutes at 370 rpm. This procedure makes it possible to obtain a coating with seven layers, the first of which is an anionic sodium alginate layer and the last of which is cationic chitosan. In the middle of the coating, there is a layer of smectite (montmorillonite) sheets (MR). These operations can be repeated up to seven times in the laboratory.

Characterisations:

The lipid particles remain dispersed in solution. The non-flocculation during the additions of charged biopolymers are followed with the naked eye.

The conductimetric monitoring of the conductance of the solutions monitors the deposition of the charged biopolymers.

Figure 13:
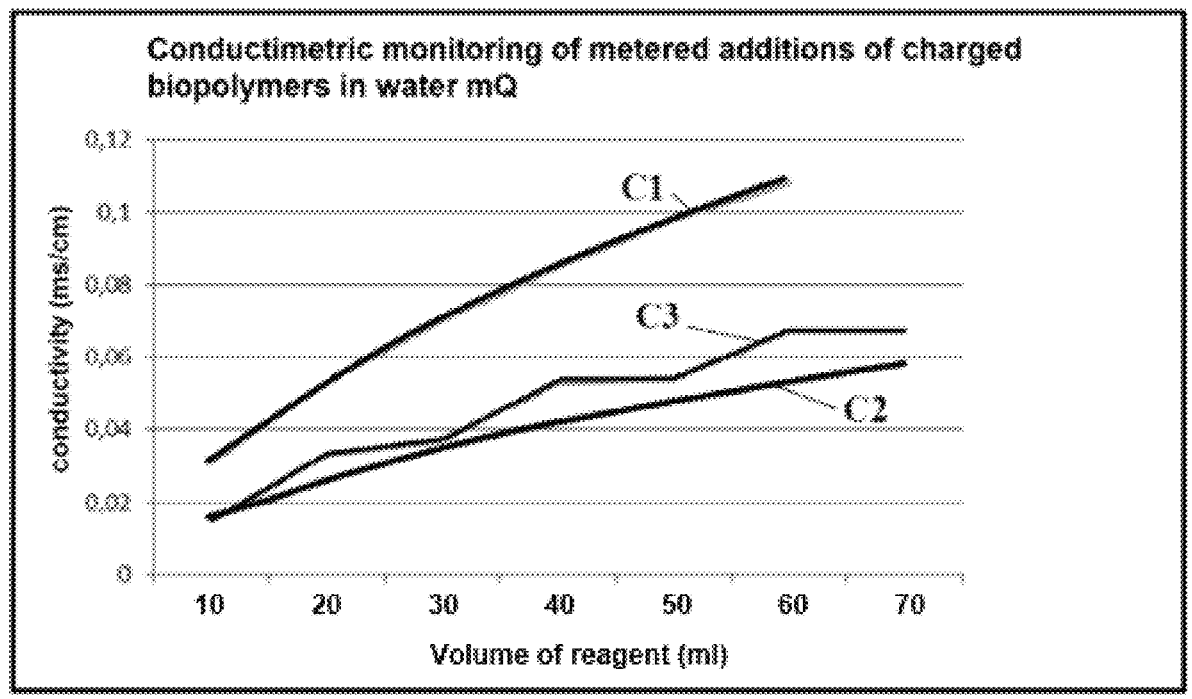
FIG. 13 shows the conductimetric monitoring of the measured additions of charged biopolymers in water.

As reference, the change in conductivity over time is measured for a solution of pure water to which metered additions are made of 0.1% chitosan solution (curve C1) then, independently, metered additions of 0.1% sodium alginate (curve C2), and finally the combination of the two (curve C3). FIG. 13 shows the results obtained.

The increase in conductivity of the solution is thus characterised during the additions of chitosan and sodium alginate, with a larger conductivity for the alginate. The combination of the two reagents results in a less rapid sawtooth increase in the conductivity compared to that of the anionic or cationic polymers alone, because the charges largely neutralise one another, and the radius of gyration of the coacervates becomes larger (apparently lower conductivity).

Figure 14:
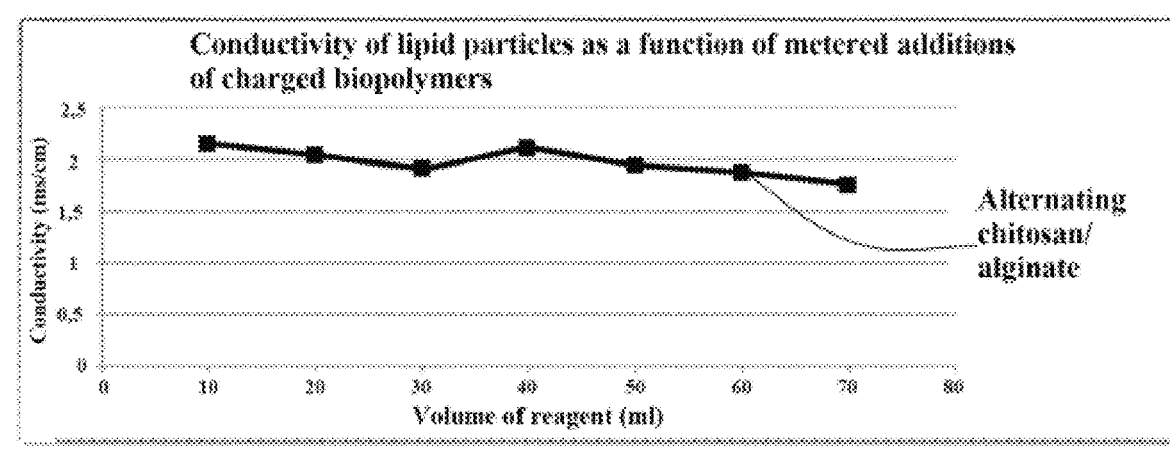
FIG. 14 shows the change over time in the conductivity of lipid particles as a function of the metered additions of charged biopolymers.

FIG. 14 shows the change over time in the conductivity of a solution of lipid particles during metered additions of charged biopolymers. This FIG. 14 shows that the addition of anionic (M−) and cationic (M+) biopolymers does not induce an increase in the conductivity of the solution; on the contrary, it decreases. This is the signature of the condensation of the anionic and cationic biopolymers at the surface of the particles, leading to the reduction in the overall conductivity of the solution, because the large lipid particles contribute little to the conductivity, and the salts in solution (osmotic agent) are trapped at the interface during the condensation, and no longer contribute to the conductivity of the solution.

The feeds and the feed supplements which constitute certain of the objects of the invention are therefore products with modular architecture which can encapsulate various nutrients and active substances and release them in the digestive system of target animals.

The stabilisation through the coating materials allows it to resist the acid medium of the stomach while enabling a rapid disintegration in a subsequent basic medium which ensures a very rapid and efficient release of the assembly of nutrients and active substances where they are most effective.

The modular architecture of the core enables of order twenty different water-soluble active substances to be incorporated in the inner aqueous phase, in the first product, this incorporation being made in particles of diameter of about 20 to 100 μm; it is also possible to incorporate of about twenty different liposoluble active substances in a matrix of diameter of about 400 μm or less.

The manufacturing method itself is very respectful of these nutrients and active substances.

The products which are objects of the invention, with their modular architecture, have very flexible usage and, by varying the manufacturing conditions, the respective dimensions of the particles and the cores can be varied, as well as the nature and quantity of active substances and nutrients in order to finally adapt them to all the target animals.

The invention claimed is:

1. Feed or feed supplement enabling controlled release of nutritive and/or physiologically active substances for monogastric animals, comprising a core and a coating of the core, said core comprising an aqueous phase A with water-soluble active substances and a lipid phase with liposoluble active components, wherein the aqueous phase A consists of gel particles, the gel particles being dispersed in the lipid phase, and wherein said lipid phase includes an exfoliated mineral filler chosen from the group of phyllosilicates.

2. Feed or feed supplement according to claim 1, wherein the phyllosilicate is a smectite.

3. Feed or feed supplement according to claim 1, wherein the dispersion of the mineral filler in the lipid phase is carried out in the presence of a surfactant.

4. Feed or feed supplement according to claim 3, wherein the surfactant has a cationic or zwitterionic polar head.

5. Feed or feed supplement according to claim 3, wherein the surfactant is lecithin.

6. Feed or feed supplement according to claim 1, wherein said mineral filler has a content in said lipid phase of between 0.5 and 35 wt % with respect to the weight of said lipid phase.

7. Feed or feed supplement according to claim 1, further including a gelled protein phase arranged between said core and said coating.

8. Feed or feed supplement according to claim 7, wherein said gelled protein phase includes a mineral filler.

9. Feed or feed supplement according to claim 1, wherein the coating of the core includes n layers C of biocompatible materials with an alternating stacking of positive and negative electrostatic charges which form cross-linked and structured coacervates in a stack of layers, n being at least equal to 2 and the n layers C comprising at least one layer C+ comprising a biocompatible material M+ with positive electrostatic charges and a cross-linking agent R− comprising a multiply charged anion, and at least one layer C− comprising a biocompatible material M− with negative electrostatic charges and a cross-linking agent R+ comprising a multivalent cation.

10. Feed or feed supplement according to claim 9, wherein the coating includes at least one layer of reinforcement material MR.

11. Feed or feed supplement according to claim 10, wherein said reinforcement material MR is selected from the group consisting of clays, silicas and charged fibres.

12. Feed or feed supplement according to claim 11, wherein reinforcement material MR comprises a phyllosilicate.

13. Feed or feed supplement according to claim 1, wherein said aqueous phase includes a negatively-charged carboxylic functionalised polysaccharide with a content of between 1 and 8 wt % relative to the weight of a dry extract of said aqueous phase.

14. Feed or feed supplement according to claim 13, wherein said aqueous phase A is gelled by reaction of said charged polysaccharide with reactants.

15. Feed or feed supplement according to claim 8, wherein said mineral filler is selected from the group consisting of clays, silicas and charged fibres.

16. Feed or feed supplement according to claim 8, wherein said mineral filler comprises a phyllosilicate.

17. Feed or feed supplement according to claim 12, wherein said phyllosilicate is a smectite.

18. Feed or feed supplement of claim 13, wherein the negatively-charged carboxylic functionalised polysaccharide is an alginate.

19. Feed or feed supplement of claim 14, wherein the reactants are a calcium salt in the presence of pyrophosphate or glucono-delta-lactone.

* * * * *